US008810376B1

(12) United States Patent
Picasso et al.

(10) Patent No.: US 8,810,376 B1
(45) Date of Patent: Aug. 19, 2014

(54) ENCODING RFID TAGS OF GROUPED ITEMS

(71) Applicants: Brent A. Picasso, Edmonds, WA (US); Vincent C. Moretti, Kenmore, WA (US); Christopher J. Diorio, Shoreline, WA (US); John A. Schroeter, Bainbridge Island, WA (US)

(72) Inventors: Brent A. Picasso, Edmonds, WA (US); Vincent C. Moretti, Kenmore, WA (US); Christopher J. Diorio, Shoreline, WA (US); John A. Schroeter, Bainbridge Island, WA (US)

(73) Assignee: Impinj, Inc., Seattle, WA (US)

( * ) Notice: Subject to any disclaimer, the term of this patent is extended or adjusted under 35 U.S.C. 154(b) by 0 days.

(21) Appl. No.: 13/623,011

(22) Filed: Sep. 19, 2012

Related U.S. Application Data

(63) Continuation of application No. 12/196,428, filed on Aug. 22, 2008, now abandoned, which is a continuation-in-part of application No. 11/472,179, filed on Jun. 20, 2006, now Pat. No. 8,154,385.

(60) Provisional application No. 61/003,627, filed on Nov. 19, 2007, provisional application No. 61/004,275, filed on Nov. 26, 2007, provisional application No. 61/005,250, filed on Dec. 4, 2007.

(51) Int. Cl.
*H04Q 5/22* (2006.01)

(52) U.S. Cl.
USPC ............ 340/10.52; 340/10.51; 340/10.1; 340/572.1; 340/686.1; 235/385

(58) Field of Classification Search
CPC ............ G06K 7/0008; G06K 19/0723; G06K 17/0022; G06K 7/10079; G06K 7/10316; G07C 9/00111; G06Q 10/087; G06Q 10/08; H04L 2209/805
USPC ............ 340/10.52, 572.1, 686.1, 10.1, 10.51; 235/385
See application file for complete search history.

(56) References Cited

U.S. PATENT DOCUMENTS

| | | | |
|---|---|---|---|
| 5,708,417 A * | 1/1998 | Tallman et al. | 340/539.23 |
| 2004/0024768 A1 * | 2/2004 | Haller | 707/100 |
| 2004/0195318 A1 * | 10/2004 | Silverbrook et al. | 235/383 |
| 2005/0093703 A1 * | 5/2005 | Twitchell | 340/572.8 |
| 2005/0150102 A1 * | 7/2005 | Bosco et al. | 29/593 |
| 2006/0091207 A1 * | 5/2006 | Chang | 235/385 |
| 2006/0267730 A1 * | 11/2006 | Steinke et al. | 340/10.1 |
| 2007/0024447 A1 * | 2/2007 | Burnside et al. | 340/572.1 |
| 2007/0262878 A1 * | 11/2007 | Maruca et al. | 340/686.1 |

* cited by examiner

*Primary Examiner* — Omer S Khan
(74) *Attorney, Agent, or Firm* — Turk IP Law, LLC

(57) ABSTRACT

Systems, methods of operation, and software are provided, for encoding RFID tags with which a predefined group of items is tagged. Encoding is by writing applicable Electronic Product Codes (EPCs) to the tags, so as to identify the individual items in the group. A base code can be read from each tag, and the applicable EPC is then written to it.

8 Claims, 17 Drawing Sheets

DATA SCHEME FOR IDENTIFYING ITEM FOR ENCODING

RFID READER SYSTEM DETAIL

ELEMENTS OF RFID TAG ENCODING STATION
& OPERATION

NETWORK-SOFTWARE CONFIGURATION

DATA SCHEME FOR IDENTIFYING ITEM FOR ENCODING

DATA SCHEME FOR IDENTIFYING ITEM FOR ENCODING

METHODS

CONTAINER DIVERTED FROM PATH,
IF ENCODING ERROR

ASSOCIATING BASE CODE
WITH FINAL EPC

DATA SCHEME FOR IDENTIFYING ITEM FOR ENCODING

ENCODING RFID TAGS OF GROUPED ITEMS

CROSS REFERENCE TO RELATED APPLICATIONS

This application is a Continuation of U.S. Utility application Ser. No. 12/196,428, filed on Aug. 22, 2008, which is hereby incorporated by reference in its entirety.

This application claims priority from of U.S. Utility application Ser. No. 11/472,179, filed on Jun. 20, 2006, which is hereby incorporated by reference in its entirety.

This application claims priority from U.S. Provisional Application Ser. No. 61/003,627, filed on Nov. 19, 2007, the disclosure of which is hereby incorporated by reference for all purposes.

This application claims priority from U.S. Provisional Application Ser. No. 61/004,275, filed on Nov. 26, 2007, the disclosure of which is hereby incorporated by reference for all purposes.

This application claims priority from U.S. Provisional Application Ser. No. 61/005,250, filed on Dec. 4, 2007, the disclosure of which is hereby incorporated by reference for all purposes.

BACKGROUND

Radio Frequency IDentification (RFID) systems typically include RFID tags and RFID readers. RFID readers are also known as RFID reader/writers or RFID interrogators. RFID systems can be used in many ways for locating and identifying objects to which the tags are attached. RFID systems are particularly useful in product-related and service-related industries for tracking objects being processed, inventoried, or handled. In such cases, an RFID tag is usually attached to an individual item, or to its package.

In principle, RFID techniques entail using an RFID reader to interrogate one or more RFID tags. The reader transmitting a Radio Frequency (RF) wave performs the interrogation. The RF wave is typically electromagnetic, at least in the far field. The RF wave can also be predominantly electric or magnetic in the near field. The RF wave may encode one or more commands that instruct the tags to perform one or more actions.

A tag that senses the interrogating RF wave responds by transmitting back another RF wave. The tag generates the transmitted back RF wave either originally, or by reflecting back a portion of the interrogating RF wave in a process known as backscatter. Backscatter may take place in a number of ways.

The reflected-back RF wave may further encode data stored internally in the tag, such as a number. The response is demodulated and decoded by the reader, which thereby identifies, counts, or otherwise interacts with the associated item. The decoded data can denote a serial number, a price, a date, a destination, other attribute(s), any combination of attributes, and so on. Accordingly, when a reader reads a tag code, data can be learned about the associated item that hosts the tag, and/or about the tag itself.

An RFID tag typically includes an antenna system, a radio section, a power management section, and frequently a logical section, a memory, or both. In earlier RFID tags, the power management section included an energy storage device, such as a battery. RFID tags with an energy storage device are known as active or semi-active tags. Advances in semiconductor technology have miniaturized the electronics so much that an RFID tag can be powered solely by the RF signal it receives. Such RFID tags do not include an energy storage device, and are called passive tags.

As mentioned above, RFID tags can be used advantageously for carrying identifying data of items that they are attached to, or otherwise associated with. A challenge, however, is that RFID tagging technology is arriving at a time when there already are established processes and machines for large-scale, quick packaging of such items. Even when such items already have RFID tags on them, encoding the corresponding data would ordinarily require an expensive overhaul of such packaging processes and machines, or slowing them down substantially.

BRIEF SUMMARY

The invention improves over the prior art.

Briefly, the present invention provides systems, methods of operation, and software for encoding RFID tags with which a predefined group of items is tagged. Encoding is by writing applicable Electronic Product Codes (EPCs) to the tags, so as to identify the individual items in the group. In some embodiments, a base code is read from each tag, and the applicable EPC is then written to it. Embodiments are especially useful for Item Level Tagging (ILT), in industries such as pharmaceuticals.

The invention offers the advantage that a number of its embodiments can be accommodated within established packaging processes and machines with little adjustment or disruption.

These and other features and advantages of the invention will be better understood from the specification of the invention, which includes the following Detailed Description and accompanying Drawings.

BRIEF DESCRIPTION OF THE DRAWINGS

The following Detailed Description proceeds with reference to the accompanying Drawings, in which.

DETAILED DESCRIPTION

Figure 1:
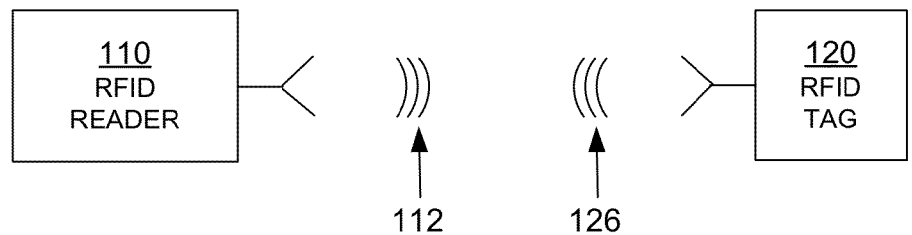
FIG. 1 is a block diagram of components of an RFID system that can be used for implementing embodiments of the invention.

The present invention is now described. While it is disclosed in its preferred form, the specific embodiments of the invention as disclosed herein and illustrated in the drawings are not to be considered in a limiting sense. Rather, these embodiments are provided so that this disclosure will be thorough and complete, and will fully convey the scope of the invention to those skilled in the art. Indeed, it should be readily apparent in view of the present description that the invention may be modified in numerous ways. Among other things, the present invention may be embodied as devices, methods, software, and so on. Accordingly, the present invention may take the form of an entirely hardware embodiment, an entirely software embodiment, an entirely firmware embodiment, or an embodiment combining aspects of the above. This description is, therefore, not to be taken in a limiting sense.

As has been mentioned, the present invention provides systems, methods of operation, and software for encoding RFID tags of a predefined group of items with applicable EPCs. The invention is now described in more detail.

FIG. 1 is a diagram of components of a typical RFID system 100, which can be used for implementing the invention. An RFID reader 110 transmits an interrogating Radio Frequency (RF) wave 112. RFID tag 120 in the vicinity of RFID reader 110 may sense interrogating RF wave 112, and generate wave 126 in response. RFID reader 110 senses and interprets wave 126.

Reader 110 and tag 120 exchange data via wave 112 and wave 126. In a session of such an exchange each encodes, modulates, and transmits data to the other, and each receives, demodulates, and decodes data from the other. The data is modulated onto, and demodulated from, RF waveforms.

Encoding the data in waveforms can be performed in a number of different ways. For example, protocols are devised to communicate in terms of symbols, also called RFID symbols. A symbol for communicating can be a delimiter, a calibration symbol, and so on. Further symbols can be implemented for ultimately exchanging binary data, such as "0" and "1", if that is desired. In turn, when the waveforms are processed internally by reader 110 and tag 120, they can be equivalently considered and treated as numbers having corresponding values, and so on.

RFID reader 110 may communicate with one or more RFID tags in any number of ways. Some such ways are described in protocols. A protocol is a specification that calls for specific manners of signaling between the reader and the tags.

One such protocol is called the Specification for RFID Air Interface-EPC™ Radio-Frequency Identity Protocols Class-1 Generation-2 UHF RFID Protocol for Communications at 860 MHz-960 MHz, which is also colloquially known as "the Gen2 Spec". Version 1.1.0 of the Gen2 Spec has been ratified by EPCglobal, which is an organization that maintains a website at: http://www.epcglobalinc.org/> at the time this document is initially filed with the USPTO. Version 1.1.0 of the Gen2 Spec is hereby incorporated by reference.

In addition, a protocol can be a variant of a stated specification such as the Gen2 Spec, for example including fewer or additional commands than the stated specification calls for, and so on. In such instances, additional commands are sometimes called custom commands.

Tag 120 can be a passive tag or an active or semi-active tag, i.e., having its own power source. Where tag 120 is a passive tag, it is powered from wave 112.

Figure 2:
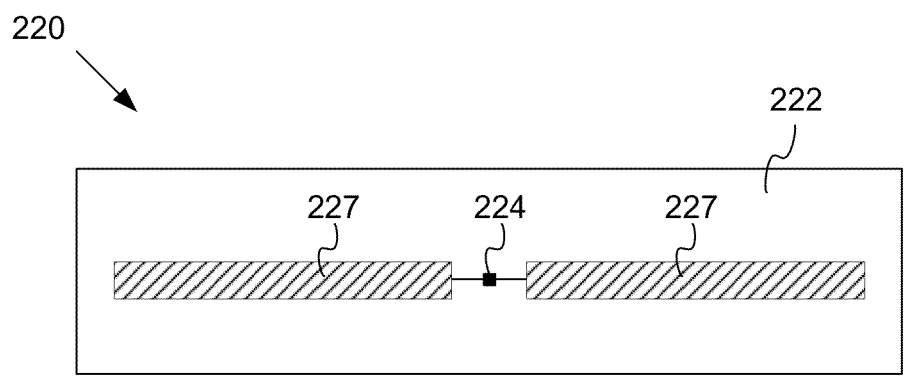
FIG. 2 is a diagram showing components of a passive RFID tag, such as a tag that can be used in the system of FIG. 1.

FIG. 2 is a diagram of an RFID tag 220, which can be the same as tag 120 of FIG. 1. Tag 220 is implemented as a passive tag, meaning it does not have its own power source. Much of what is described in this document, however, applies also to active tags.

Tag 220 is formed on a substantially planar inlay 222, which can be made in many ways known in the art. Tag 220 includes an electrical circuit, which is preferably implemented in an integrated circuit (IC) 224. IC 224 is arranged on inlay 222.

Tag 220 also includes an antenna for exchanging wireless signals with its environment. The antenna is usually flat and attached to inlay 222. IC 224 is electrically coupled to the antenna via suitable antenna ports (not shown in FIG. 2).

The antenna may be made in a number of ways, as is well known in the art. In the example of FIG. 2, the antenna is made from two distinct antenna segments 227, which are shown here forming a dipole. Many other embodiments are possible, using any number of antenna segments.

In some embodiments, an antenna can be made with even a single segment. Different points of the segment can be coupled to one or more of the antenna ports of IC 224. For example, the antenna can form a single loop, with its ends coupled to the ports. It should be remembered that, when the single segment has more complex shapes, even a single segment could behave like multiple segments, at the frequencies of RFID wireless communication.

In operation, a signal is received by the antenna, and communicated to IC 224. IC 224 both harvests power, and responds if appropriate, based on the incoming signal and its internal state. In order to respond by replying, IC 224 modulates the reflectance of the antenna, which generates the backscatter from a wave transmitted by the reader. Coupling together and uncoupling the antenna ports of IC 224 can modulate the reflectance, as can a variety of other means.

In the embodiment of FIG. 2, antenna segments 227 are separate from IC 224. In other embodiments, antenna segments may alternately be formed on IC 224, and so on.

Figure 3:
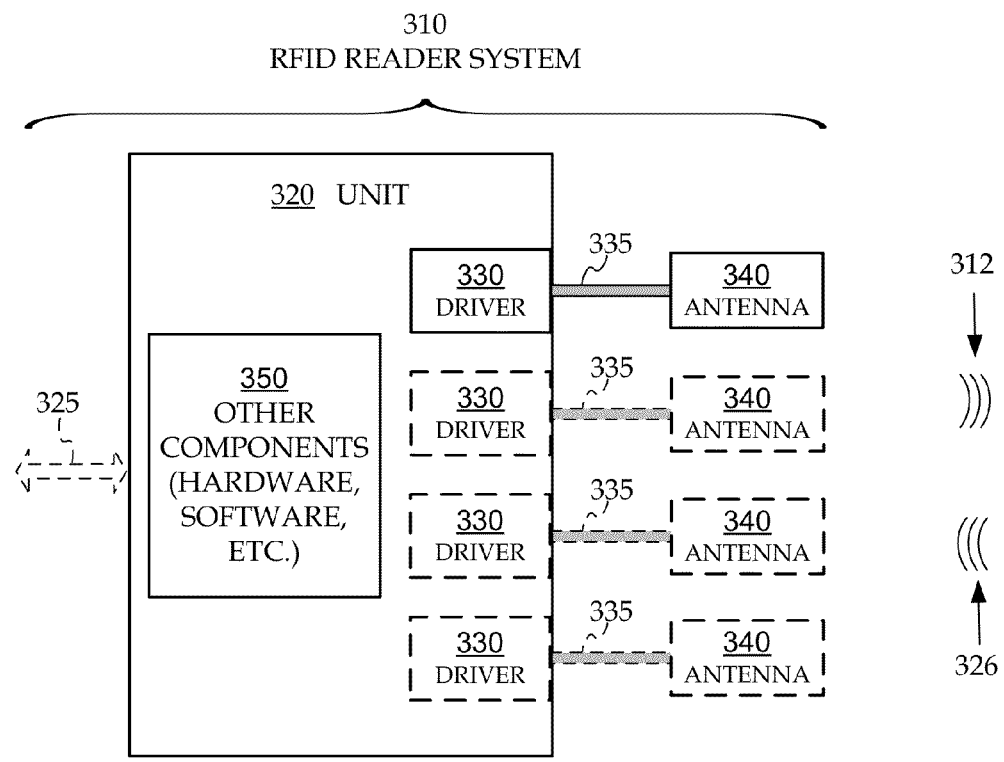
FIG. 3 is a block diagram showing a detail of an RFID reader system, such as the one shown in FIG. 1.

FIG. 3 is a block diagram showing a detail of an RFID reader system 310, which can be the same as reader 110 shown in FIG. 1. A unit 320 is also known as a box 320, and has one or more antenna drivers 330. In some embodiments it has four drivers 330. For each driver 330 there is an output connector. The output connector is typically for a coaxial cable. Accordingly, connectors 335 can be attached to the outputs of the provided respective drivers 330, and then connectors 335 can be attached to respective antennas 340.

A driver 330 can send to its respective antenna 340 a driving signal that is in the RF range, which is why connector 335 is typically but not necessarily a coaxial cable. The driving signal causes antenna 340 to transmit an RF wave 312, which is analogous to RF wave 112 of FIG. 1. In addition, RF wave 326 can be backscattered from the RFID tags, analogous to RF wave 126 of FIG. 1. Backscattered RF wave 326 is received by an antenna 340 and ultimately becomes a signal sensed by unit 320.

Unit 320 also has other components 350, such as hardware and/or software and/or firmware, which are described in more detail later in this document. Components 350 control drivers 330, and as such cause RF wave 312 to be transmitted, and the sensed backscattered RF wave 326 to be interpreted. Optionally and preferably there is a communication link 325 to other equipment, such as computers and the like, for remote operation of system 310.

Figure 4:
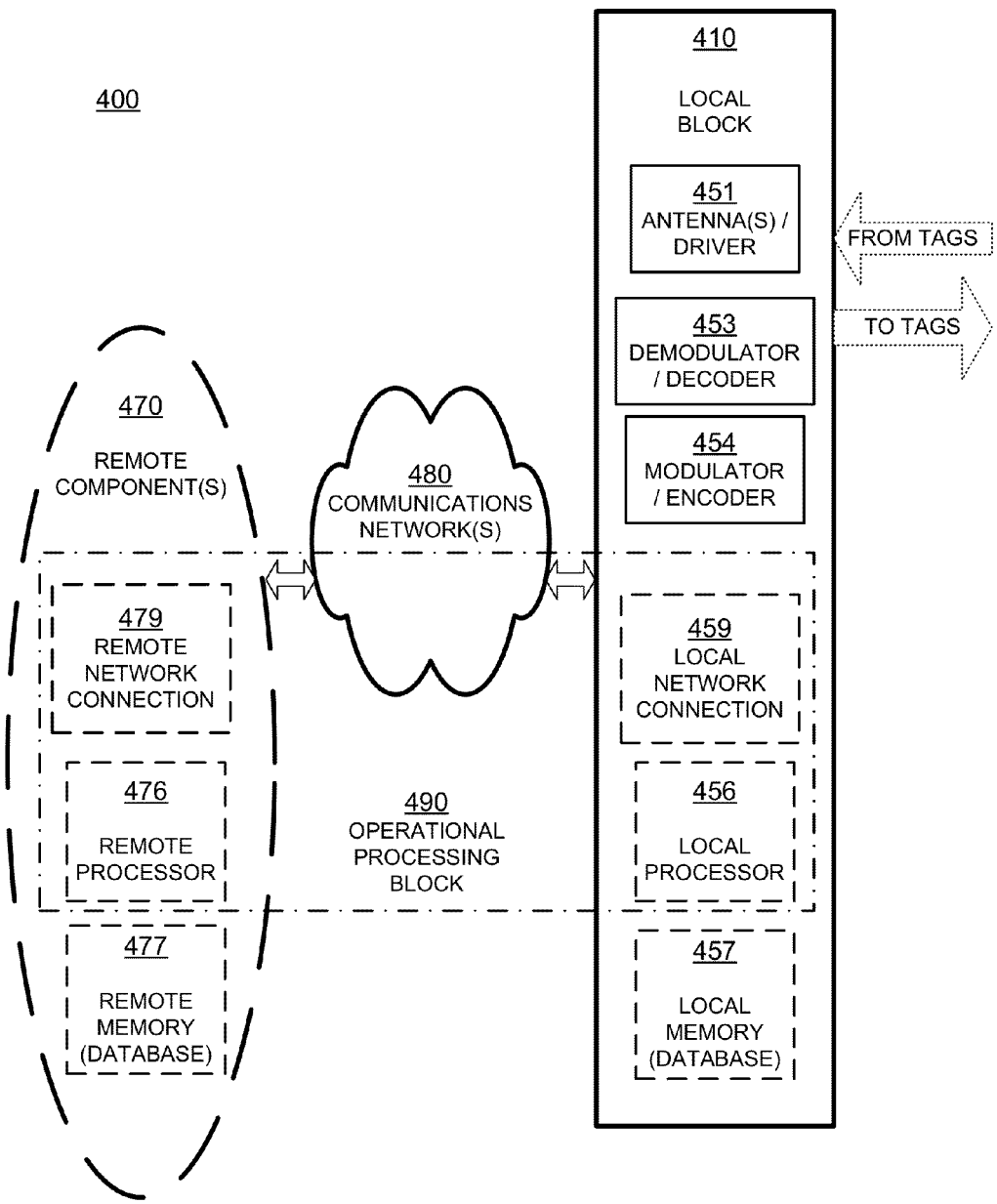
FIG. 4 is a block diagram of a whole RFID reader system according to embodiments.

FIG. 4 is a block diagram of a whole RFID reader system 400 according to embodiments. System 400 includes a local block 410, and optionally remote components 470. Local block 410 and remote components 470 can be implemented in any number of ways. It will be recognized that reader 110 of FIG. 1 is the same as local block 410, if remote components 470 are not provided. Alternately, reader 110 can be implemented instead by system 400, of which only the local block 410 is shown in FIG. 1. Plus, local block 410 can be unit 320 of FIG. 3.

Local block 410 is responsible for communicating with the tags. Local block 410 includes a block 451 of an antenna and a driver of the antenna for communicating with the tags. Some readers, like that shown in local block 410, contain a single antenna and driver. Some readers contain multiple antennas and drivers and a method to switch signals among them, including sometimes using different antennas for transmitting and for receiving. And some readers contain multiple antennas and drivers that can operate simultaneously. A demodulator/decoder block 453 demodulates and decodes backscattered waves received from the tags via antenna block 451. Modulator/encoder block 454 encodes and modulates an RF wave that is to be transmitted to the tags via antenna block 451.

Local block 410 additionally includes an optional local processor 456. Processor 456 may be implemented in any number of ways known in the art. Such ways include, by way of examples and not of limitation, digital and/or analog processors such as microprocessors and digital-signal processors (DSPs); controllers such as microcontrollers; software running in a machine such as a general purpose computer; programmable circuits such as Field Programmable Gate Arrays (FPGAs), Field-Programmable Analog Arrays (FPAAs), Programmable Logic Devices (PLDs), Application Specific Integrated Circuits (ASIC), any combination of one or more of these; and so on. In some cases, some or all of the decoding function in block 453, the encoding function in block 454, or both, may be performed instead by processor 456.

Local block 410 additionally includes an optional local memory 457. Memory 457 may be implemented in any number of ways known in the art. Such ways include, by way of examples and not of limitation, nonvolatile memories (NVM), read-only memories (ROM), random access memories (RAM), any combination of one or more of these, and so on. These can be implemented separately from processor 456, or in a single chip, with or without other components. Memory 457, if provided, can store programs for processor 456 to run, if needed.

In some embodiments, memory 457 stores data read from tags, or data to be written to tags, such as Electronic Product Codes (EPCs), Tag Identifiers (TIDs) and other data. Memory 457 can also include reference data that is to be compared to the EPC codes, instructions and/or rules for how to encode commands for the tags, modes for controlling antenna 451, and so on. In some of these embodiments, local memory 457 is provided as a database.

Some components of local block 410 typically treat the data as analog, such as the antenna/driver block 451. Other components such as memory 457 typically treat the data as digital. At some point there is a conversion between analog and digital. Based on where this conversion occurs, a whole reader may be characterized as "analog" or "digital", but most readers contain a mix of analog and digital functionality.

If remote components 470 are indeed provided, they are coupled to local block 410 via an electronic communications network 480. Network 480 can be a Local Area Network (LAN), a Metropolitan Area Network (MAN), a Wide Area Network (WAN), a network of networks such as the internet, or a mere local communication link, such as a USB, PCI, and so on. In turn, local block 410 then includes a local network connection 459 for communicating with network 480.

There can be one or more remote component(s) 470. If more than one, they can be located at the same location, or in different locations. They can access each other and local block 410 via network 480, or via other similar networks, and so on. Accordingly, remote component(s) 470 can use respective remote network connections. Only one such remote network connection 479 is shown, which is similar to local network connection 459, etc.

Remote component(s) 470 can also include a remote processor 476. Processor 476 can be made in any way known in the art, such as was described with reference to local processor 456.

Remote component(s) 470 can also include a remote memory 477. Memory 477 can be made in any way known in the art, such as was described with reference to local memory 457. Memory 477 may include a local database, and a different database of a Standards Organization, such as one that can reference EPCs.

Of the above-described elements, it is advantageous to consider a combination of these components, designated as operational processing block 490. Block 490 includes those components that are provided of the following: local processor 456, remote processor 476, local network connection 459, remote network connection 479, and by extension an applicable portion of network 480 that links connection 459 with connection 479. The portion can be dynamically changeable, etc. In addition, block 490 can receive and decode RF waves received via antenna 451, and cause antenna 451 to transmit RF waves according to what it has processed.

Block 490 includes either local processor 456, or remote processor 476, or both. If both are provided, remote processor 476 can be made such that it operates in a way complementary with that of local processor 456. In fact, the two can cooperate. It will be appreciated that block 490, as defined this way, is in communication with both local memory 457 and remote memory 477, if both are present.

Accordingly, block 490 is location agnostic, in that its functions can be implemented either by local processor 456, or by remote processor 476, or by a combination of both. Some of these functions are preferably implemented by local processor 456, and some by remote processor 476. Block 490 accesses local memory 457, or remote memory 477, or both for storing and/or retrieving data.

Reader system 400 operates by block 490 generating communications for RFID tags. These communications are ultimately transmitted by antenna block 451, with modulator/encoder block 454 encoding and modulating the information on an RF wave. Then data is received from the tags via antenna block 451, demodulated and decoded by demodulator/decoder block 453, and processed by processing block 490.

Figure 5:
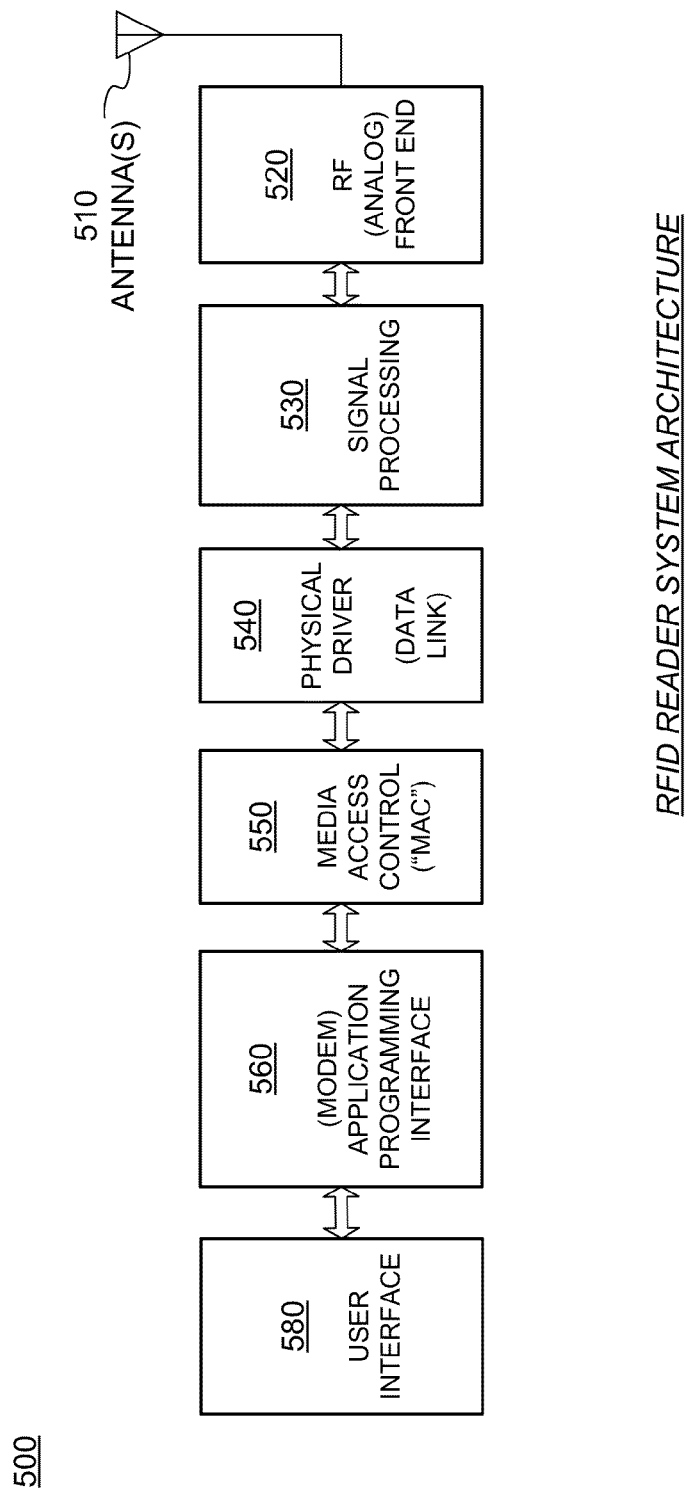
FIG. 5 is a block diagram illustrating an overall architecture of an RFID reader system according to embodiments.

FIG. 5 is a block diagram illustrating an overall architecture of an RFID reader system 500 according to embodiments. It will be appreciated that system 500 is considered subdivided into modules or components. Each of these modules may be implemented by itself, or in combination with others. It will be recognized that some aspects are parallel with those of FIG. 4. In addition, some of them may be present more than once.

RFID reader system 500 includes one or more antennas 510, and an RF Front End 520, for interfacing with antenna(s) 510. These can be made as described above. In addition, Front End 520 typically includes analog components.

System 500 also includes a Signal Processing module 530. In this embodiment, module 530 exchanges waveforms with Front End 520, such as I and Q waveform pairs. In some embodiments, signal processing module 530 is implemented by itself in an FPGA.

System 500 also includes a Physical Driver module 540, which is also known as Data Link. In this embodiment, module 540 exchanges bits with module 530. Data Link 540 can be the stage associated with framing of data. In one embodiment, module 540 is implemented by a Digital Signal Processor.

System 500 additionally includes a Media Access Control module 550, which is also known as MAC layer. In this embodiment, module 550 exchanges packets of bits with module 540. MAC layer 550 can be the stage for making decisions for sharing the medium of wireless communication, which in this case is the air interface. Sharing can be between reader system 500 and tags, or between system 500 with another reader, or between tags, or a combination. In one embodiment, module 550 is implemented by a Digital Signal Processor.

System 500 moreover includes an Application Programming Interface module 560, which is also known as API, Modem API, and MAPI. In some embodiments, module 560 is itself an interface for a user.

All of these functionalities can be supported by one or more processors. One of these processors can be considered a host processor. Such a processor would, for example, exchange signals with MAC layer 550 via module 560. In some embodiments, the processor can include applications for system 500. In some embodiments, the processor is not considered as a separate module, but one that includes some of the above-mentioned modules of system 500.

A user interface 580 may be coupled to API 560. User interface 580 can be manual, automatic, or both. It can be supported by a separate processor than the above mentioned processor, or implemented on it.

It will be observed that the modules of system 500 form something of a chain. Adjacent modules in the chain can be coupled by the appropriate instrumentalities for exchanging signals. These instrumentalities include conductors, buses, interfaces, and so on. These instrumentalities can be local, e.g. to connect modules that are physically close to each other, or over a network, for remote communication.

The chain is used in opposite directions for receiving and transmitting. In a receiving mode, wireless waves are received by antenna(s) 510 as signals, which are in turn processed successively by the various modules in the chain. Processing can terminate in any one of the modules. In a transmitting mode, initiation can be in any one of these modules. Ultimately, signals are routed internally, for antenna(s) 510 to transmit as wireless waves.

The architecture of system 500 is presented for purposes of explanation, and not of limitation. Its particular subdivision into modules need not be followed for creating embodiments according to the invention. Furthermore, the features of the invention can be performed either within a single one of the modules, or by a combination of them.

Figure 6:
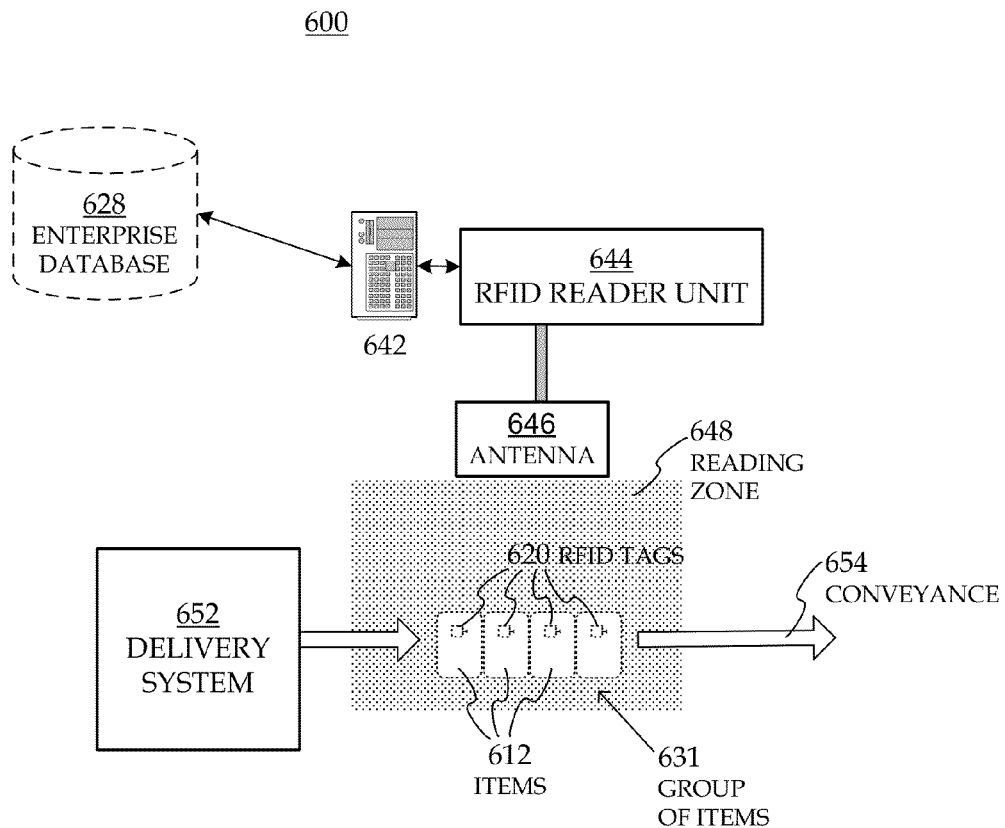
FIG. 6 is a diagram showing elements and an operation of an RFID tag encoding station according to embodiments.

FIG. 6 is a diagram showing elements 600 and an operation of an RFID tag encoding station made according to embodiments. An encoding station according to the invention is also known as an encoding system. The encoding station may be used with a host system that packages items such as items 612. Items 612 are tagged with RFID tags 620. This means that RFID tags 620 are attached to items 612, or otherwise associated with them. For example, a tag can be free floating in a space within the item. The host system packages the items by aggregating them into groups such as a group 631. A group can be for items in a box, or bundled, e.g. in plastic or shrink wrap, and so on. Such items can be pillboxes, being packaged into a group that goes into a container. Alternately, the items can be pills being placed in a pillbox, the pills being individually tagged with an RFID tag that is adequately small and safe to be edible. The invention of course does not apply only to pharmaceuticals—the above are given only as examples.

Elements 600 include an RFID reader unit 644 with a connected antenna 646. RFID reader unit 644 can be coupled to a computer 642, which may be connected to an enterprise database 628. These can work as described above for RFID reader systems, and further in view of the needs of the host packaging system. In addition, final EPCs can be stored in RFID reader unit 644, or computer 642, or enterprise database 628, for encoding to tags 620.

Antenna 646 defines a reading zone 648. This can be accomplished by the orientation of the antenna. Reading zone 648 can be further confined by shielding, and so on.

In the example of FIG. 6, the host system includes a delivery system 652 for group 631. Delivery system 652 can deliver group 631 to reading zone 648. Alternately, delivery can be by a human.

In addition, the host packaging system provides a main path for conveyance 654 of group 631 out of reading zone 648. Encoding operations can take place according to embodiments when group 631 is within reading zone 648 at least in part. In addition, sensors can optionally detect when group 631 is delivered into the reading zone 648, and when group 631 has been conveyed out of it. If such sensors are included, reader 644 can be triggered to operate responsive to signals from such sensors.

Figure 7:
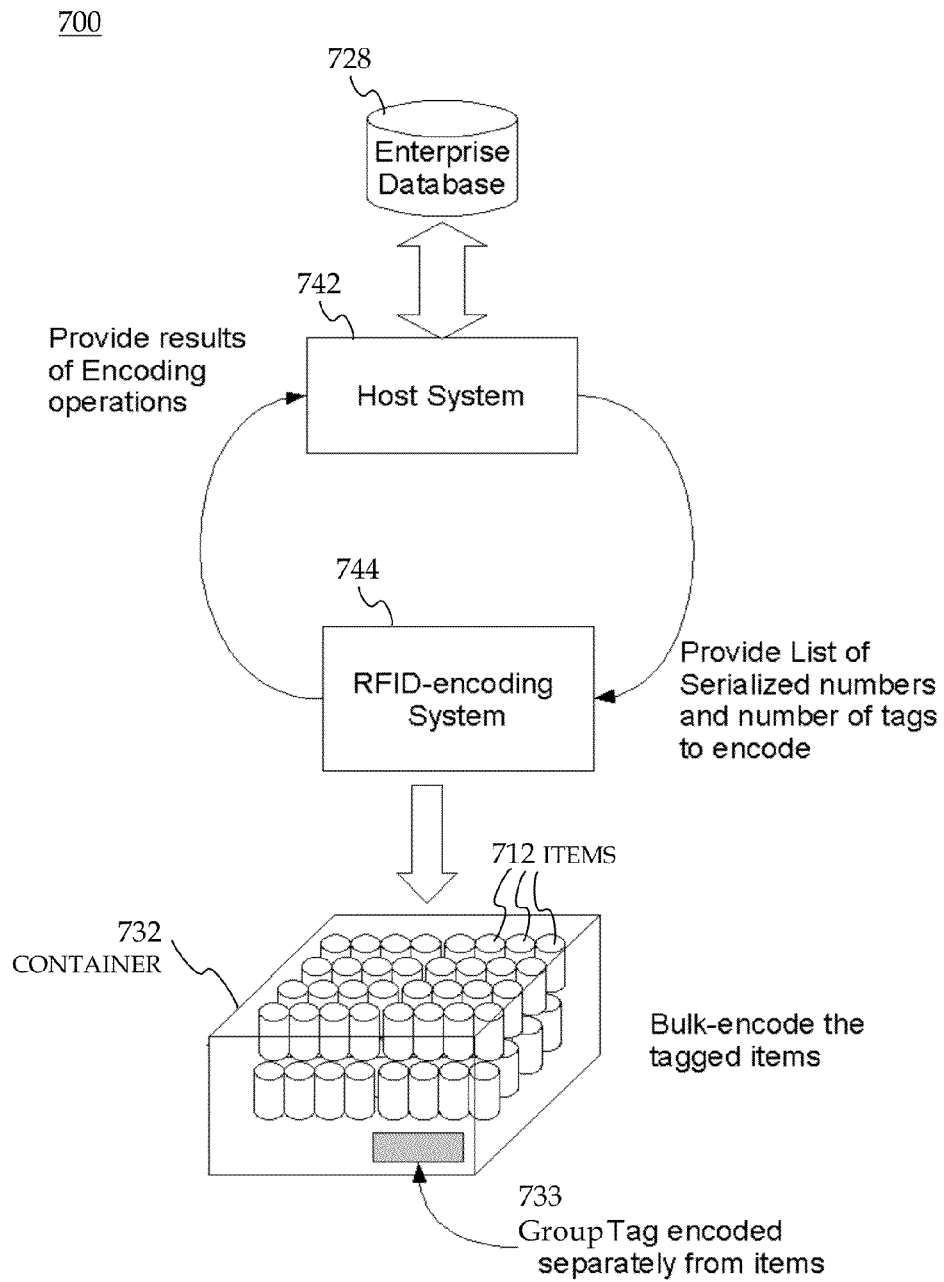
FIG. 7 is a diagram showing components for implementing a network-software portion for a particular embodiment of the elements of FIG. 6.

FIG. 7 is a diagram showing components 700 for implementing a network-software portion for a particular embodiment of the elements of FIG. 6. In the embodiment of FIG. 7, items 712 have been packaged into an opaque container 732, such as a cardboard box. In addition, a group RFID tag 733 is associated with the container, preferably being attached to it. Group RFID tag 733 can contain information about the whole group, including error information, as will be seen below in more detail.

Components 700 include an RFID encoding system 744 that communicates with a host system 742, and which in turn communicates with enterprise database 728. These can reside in suitable ones of the components of FIG. 6.

Figure 8:
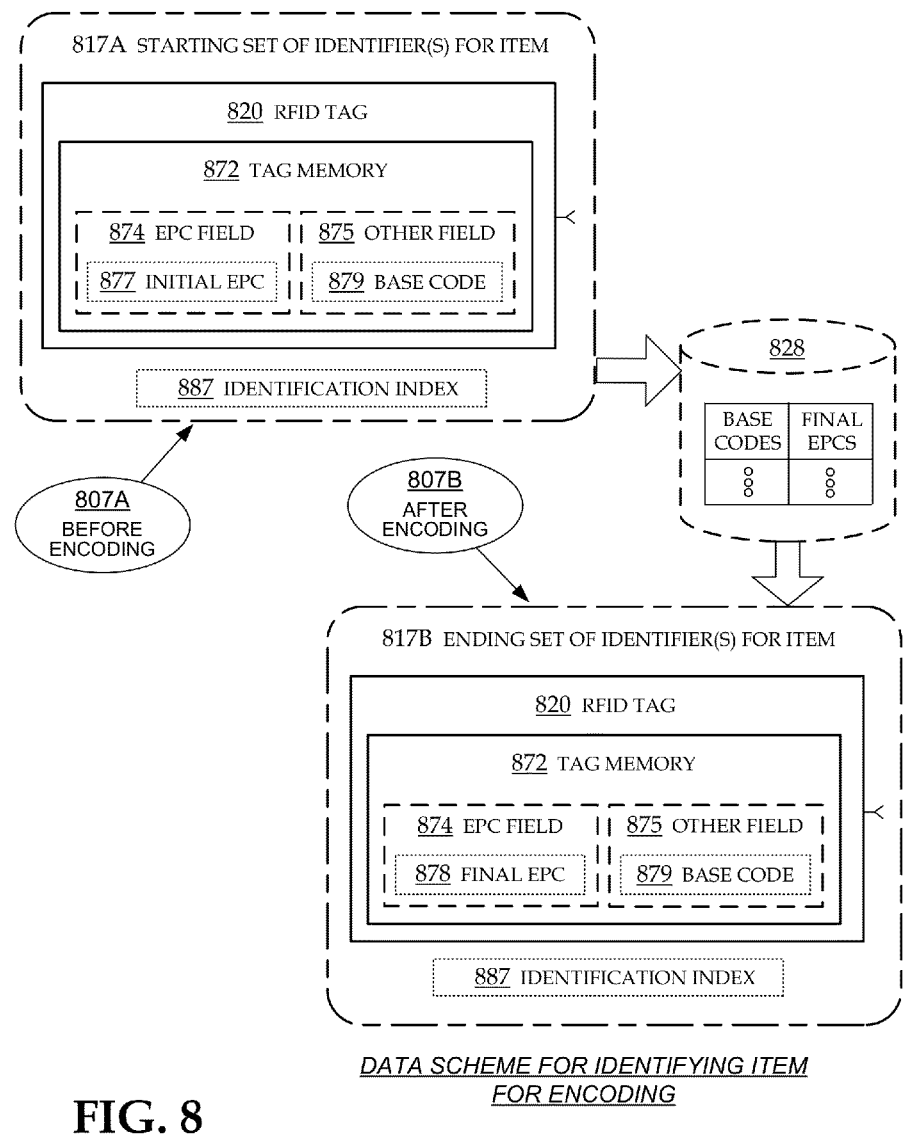
FIG. 8 is a diagram showing a first data scheme that can be used to identify an item for encoding, according to embodiments.

FIG. 8 is a diagram showing a first data scheme that can be used to identify an item according to embodiments, for the encoding. According to a comment 807A, a starting set 817A of identifiers is provided for the item before encoding. Set 817A includes an RFID tag 820, similar, for example, to tag 620, tag 120, tag 220, etc. Set 817A may also optionally include an item that bears an additional identification index 887, for reasons that will be understood later in this document.

RFID tag 820 includes a memory 872. Memory 872 can include an EPC field 874, where EPC stands for Electronic Product Code, which can be the primary code for identifying an item via its RFID tag. This primary code is the first stored and specific code that a tag backscatters, after it has been singulated. For tags that are consistent with the Gen2 Spec v.1.1.0, EPC field 874 can be defined consistently with how an EPC Memory is defined in the Gen2 Spec v.1.1.0.

Memory 872 can further optionally include additional fields. One such other field 875 is shown.

As a first example, other field 875 can be where a unique tag identifier code is stored, which identifies a manufacturer of a circuit of the first tag. In the parlance of the Gen2 Spec v.1.1.0, such a code can be the TID code.

As a second example, other field 875 can be where more general data is stored, in ways determined by the user of the tag. This is often called user memory. For some implementations, this other memory 875 can be a user memory defined consistently with how a User Memory is defined in the Gen2 Spec v.1.1.0.

According to a comment 807B, an ending set 817B of identifiers is provided for the same item, after encoding. Set 817B includes RFID tag 820, after a portion of its memory has been written. In addition, identification index 887 may or may not have stayed the same.

In starting set 817A, a base code 879 is written in other field 875. Base code 879 is planned by the user. Base code 879 can be made from binary bits.

In ending set 817B, base code 879 can remain written in other field 875, or be erased from there. In addition, a final EPC 878 has been written in EPC field 874. Final EPC 878 can be derived in a number of ways. In some embodiments, the final EPC is the same as base code 879. In other embodiments, the final EPC is derived from base code 879. In yet other embodiments, the final EPC is looked up from base code 879. Looking up can be from a suitable table in database 828, which can reside in a suitable instrumentality, such as reader unit 644, computer 642, or enterprise database 628. As will be appreciated later, identification index 887 may help create the table in database 828.

Moreover, in starting set 817A, optionally an initial EPC 877 can be stored in EPC field 874. As can be seen from ending set 817B, final EPC 878 is written over initial EPC 877.

Figure 9:
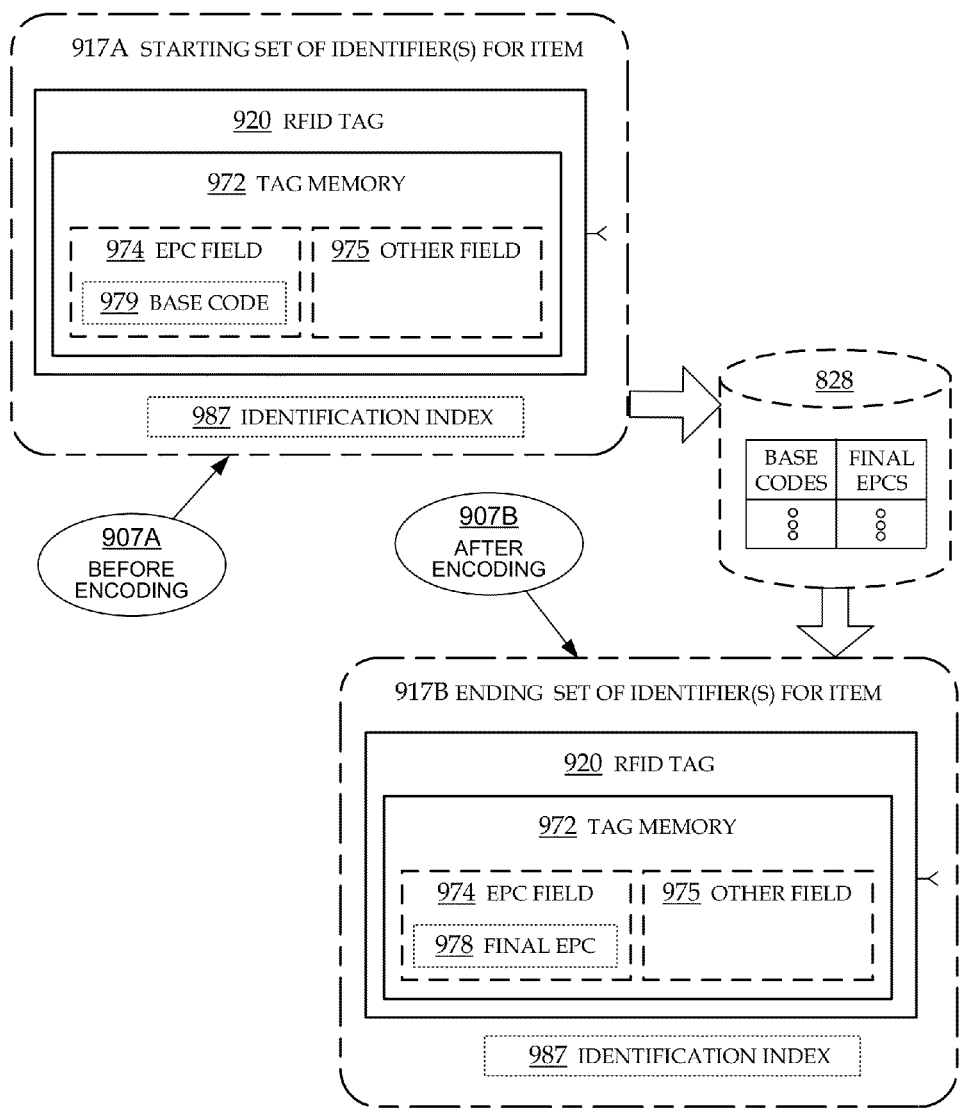
FIG. 9 is a diagram showing a second data scheme that can be used to identify an item for encoding, according to other embodiments.

FIG. 9 is a diagram showing a second data scheme that can be used to identify items according to other embodiments, for the encoding. According to a comment 907A, a starting set 917A of identifiers is provided for the item before encoding. Set 917A includes an RFID tag 920, similar, for example, to tag 820. Set 917A may also optionally include an item that bears an additional identification index 987, similar to additional identification index 887.

RFID tag 920 includes a memory 972, which can be similar to memory 872. Memory 972 can include an EPC field 974, which can be similar to EPC field 874. Memory 972 can further optionally include additional fields. One such other field 975 is shown, which can be similar to other field 875.

According to a comment 907B, an ending set 917B of identifiers is provided for the same item, after encoding. Set 917B includes RFID tag 920, after a portion of its memory has been written. In addition, identification index 987 may or may not have stayed the same.

In starting set 917A, a base code 979 is written in EPC field 974. In ending set 917B, a final EPC 978 has been written in EPC field 974. Accordingly, base code 979 is overwritten by final EPC 978.

There are advantages and disadvantages of each of the data schemes of FIG. 8 and FIG. 9. Some will be discerned by a person having ordinary skill in the art in view of the present description, and also in view of the needs and available capabilities in the particular implementation.

The invention also includes methods. Some are methods of operation of an RFID reader or RFID reader system. Others are methods for controlling an RFID reader or RFID reader system. For example, computer 642 and/or RFID reader 644 can operate according to methods of the invention. For another example, host system 742 and/or RFID encoding system 744 can operate according to methods of the invention.

These methods can be implemented in any number of ways, including by the structures described in this document. One such way is by machine operations, of devices of the type described in this document.

Another optional way is for one or more of the individual operations of the methods to be performed in conjunction with one or more human operators performing some of them. These human operators need not be collocated with each other, but each can be only with a machine that performs a portion of the method.

Methods are now described more particularly according to embodiments.

Figure 10:
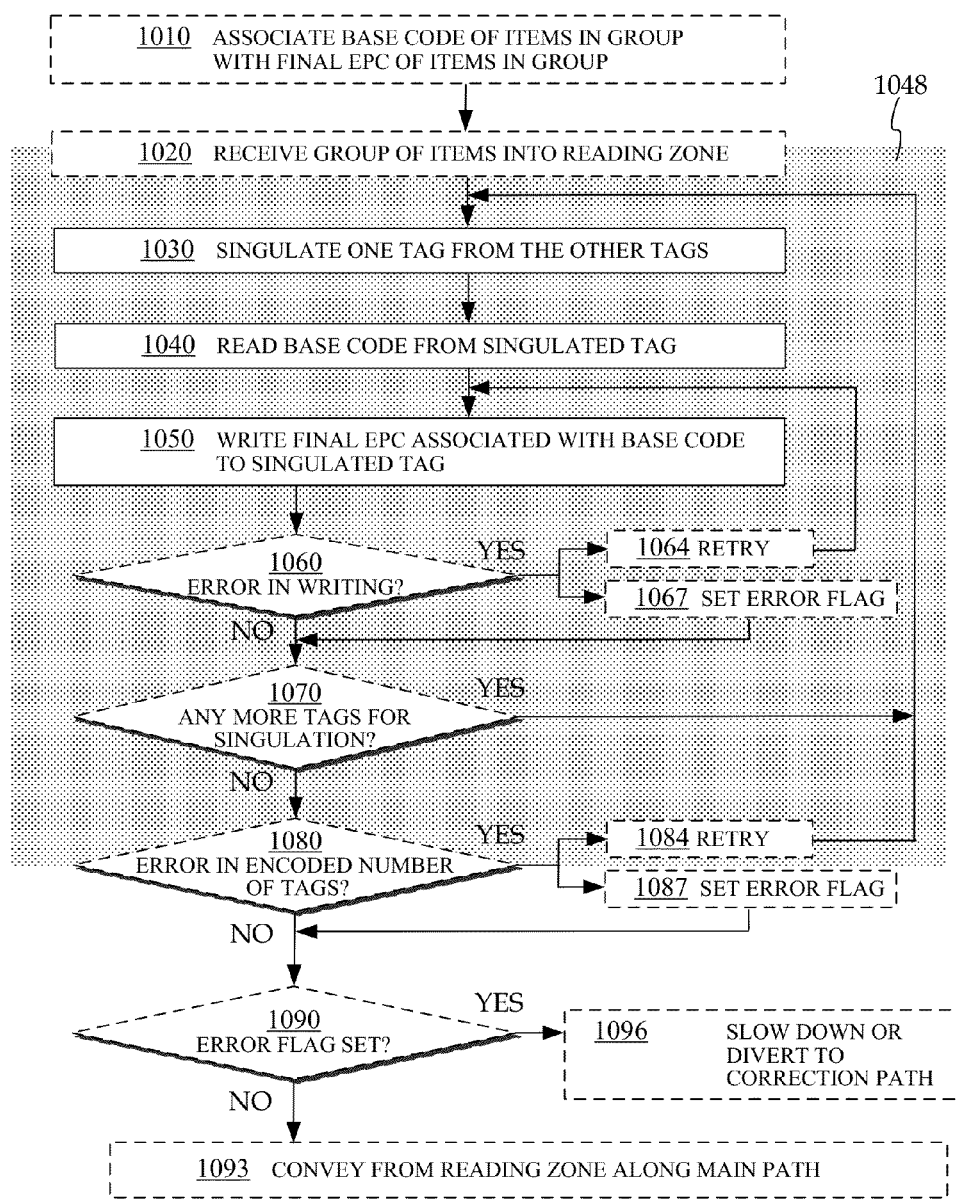
FIG. 10 is a flowchart showing methods according to embodiments.

FIG. 10 is flowchart 1000 illustrating methods according to embodiments. The methods of flowchart 1000 may be practiced by different embodiments, including but not limited to portions of the systems and the software described in this document.

The methods of flowchart 1000 can be used by an RFID reader system component to write final EPCs to RFID tags of a predefined group of tagged items, such as group 631. Preferably, this takes place when the group has been received into a reading zone defined by an antenna coupled to the RFID reader system component. Some of the operations of flowchart 1000 can take place while the group is in the reading zone, and others while the group is outside of it. To assist in the illustration, flowchart 1000 is also shown with an icon 1048 for a reading zone, within which there are some of the operations of flowchart 1000, but not others. The coverage of icon 1048 in FIG. 10 is only for example, not for limitation.

At an optional operation 1010, base codes of the respective items in the group become associated with final Electronic Product Codes (EPCs). This can take place before the group is received into a reading zone 1048. A process for that is described later in this document. When performed, the association is stored in a suitable memory, if necessary.

At optional next operation 1020, the group is received into the reading zone. This can take place by delivery system 652, or manually, and so on.

At next operation 1030, a first one of the tags is singulated from the other tags. This can be performed by a reader in accordance to a tag inventorying algorithm. At this point, the reader knows that it is talking only to that one tag, while the others remain suspended.

At next operation 1040, a base code is read from the singulated tag. This can be performed in any number of ways, depending on which data scheme is used for storing the base code. Two sample data schemes have been described with reference to FIG. 8 and FIG. 9.

At next operation 1050, one of the final EPCs is written to an EPC memory of the singulated first tag. The final EPC is one that is associated with the base code read at operation 1040. Association can be as described above and/or as established at operation 1010. In some embodiments, the EPC memory of operation 1050 is EPC memory field 874 or 974. In some embodiments, this EPC memory is defined consistently with how an EPC Memory is defined in the Gen2 Spec v.1.1.0.

In conjunction with writing, other operations may be performed. For example, the written final EPC can also be locked in a memory of the first tag. The locking can be reversible or irreversible, and so on.

At optional next operation 1060, it can be confirmed that the final EPC has been written successfully to the first tag. If not, then a number of embodiments can be implemented. For a first example, according to operation 1064, there can be a retry, i.e., another attempt to write the final EPC via operation 1050. For a second example, according to operation 1067, an error flag can be set, and the process can continue. In embodiments where a group RFID tag is provided with the group, the error flag can be set as an error indication in data of the group RFID tag. For example, in FIG. 7, group tag 733 can be encoded separately from the items. In addition, it can have such an error indication, so that the error can be fixed later.

At optional next operation 1070, it can be inquired whether there are any more tags for singulation. If so, the remaining tags of the remaining items in the group are successively singulated, and final EPCs can be written to their memories, when each is singulated.

At optional next operation 1080, it can be inquired whether a number of the singulated tags disagrees with a preset group number, which is the number of expected tags. In embodiments where a group RFID tag is provided with the group, then the preset group number is determined from data of the group RFID tag.

If the number of the singulated tags disagrees with the preset group number, then a number of embodiments can be implemented. For a first example, according to operation 1084, there can be a retry to go through the tags.

For a second example, according to operation 1087, an error flag can be set. In embodiments where a group RFID tag is provided with the group, the error flag can be set as an error indication in data of the group RFID tag. This error indication can be the same or different as that set from operation 1067.

At optional next operation 1090, it is inquired whether an error flag is set, such as one of the ones described above. In embodiments where a group RFID tag is provided with the group, then the inquiry can be from data of the group RFID tag.

If the flag is not set, then according to operation 1093, the group proceeds along a main path. An example is now described.

Figure 11:
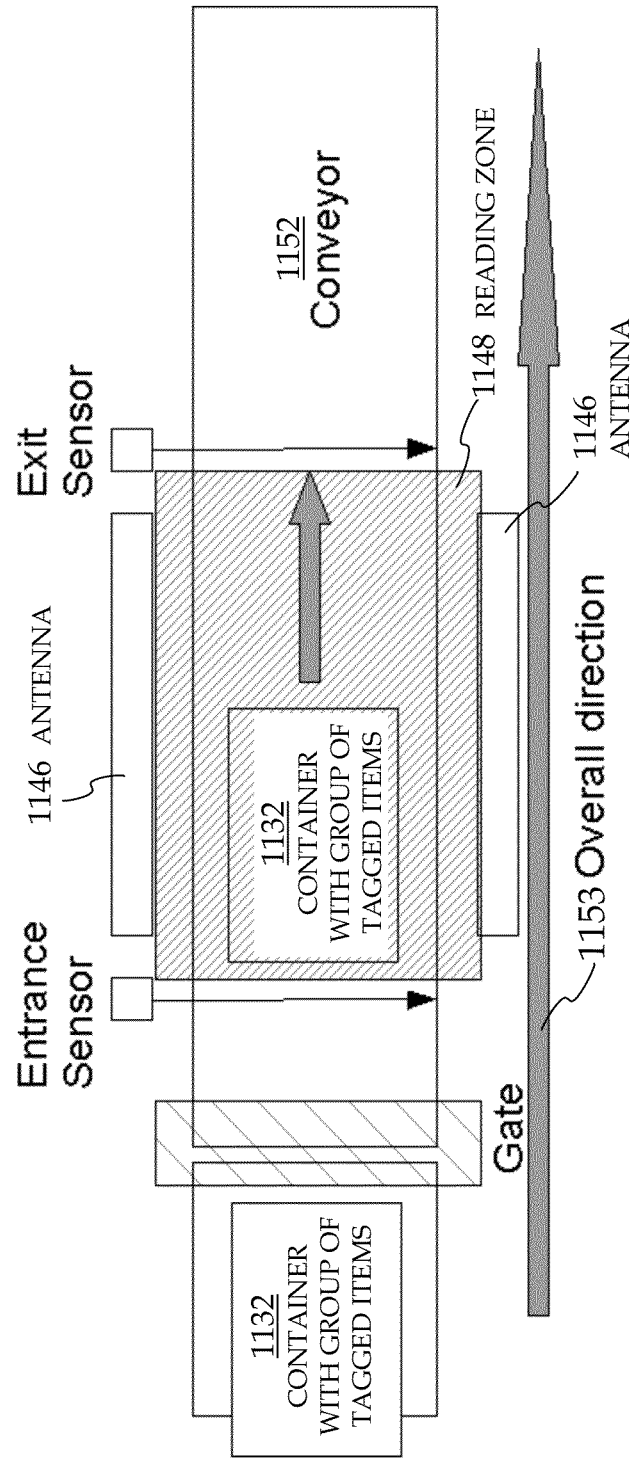
FIG. 11 is a diagram showing an embodiment of a portion of an RFID tag encoding station.

FIG. 11 is a diagram 1100 showing an embodiment of a portion of an RFID tag encoding station. Two antennas 1146 define a reading zone 1148. A delivery system is implemented by a conveyor 1152, moving in an overall direction 1153. Conveyor 1152 delivers containers 1132 into reading zone 1148, and then conveys them out of it. Sensors can be provided at the entrance and exit of reading zone 1148, to coordinate the operation of a reader (not shown).

Returning to FIG. 10, if at operation 1090 an error flag is set, then as per operation 1096, there can be a number of embodiments. In a first set of options, the group can be slowed down. For example, it can be conveyed at a chosen point in the reading zone at a first speed if the error flag is not set, and at a second speed different from the first speed if the error flag is set. The second speed can be slower than the first speed, or zero, or negative, i.e. in an opposite direction than the first speed. A second set of options is now described.

Figure 12:
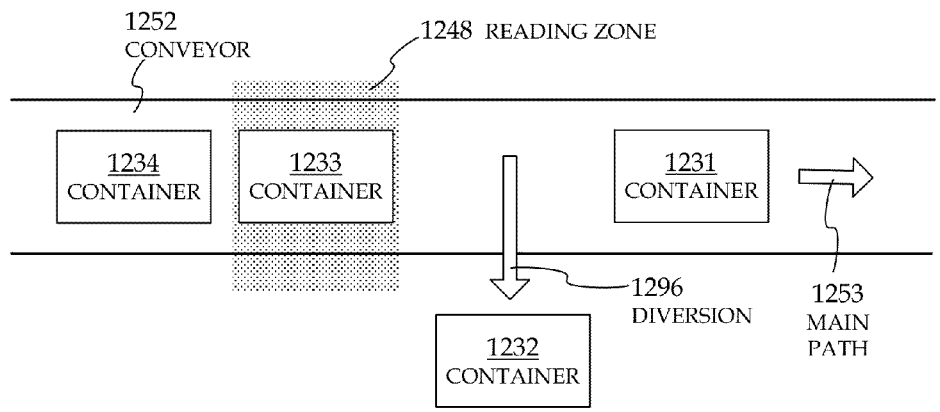
FIG. 12 is a diagram showing an operation of a portion of an RFID tag encoding station, according to embodiments.

FIG. 12 is a diagram showing an operation of a portion of an RFID tag encoding station according to embodiments. A conveyor 1252 is provided to convey containers 1231, 1232, 1233, 1234 of grouped tagged items through a reading zone 1248 along a main path 1253. In this example, the error flag is set for container 1232, which is therefore diverted from main path 1253, according to arrow 1296. In this example, diversion 1296 is after exiting reading zone 1248, but it could be before, and so on.

In a number of embodiments, for a single group, a number of base codes may be provided, along with a number of associated final EPCs. This was first hinted at in operation 1010 of FIG. 10, and in a table in database 828 of FIGS. 8 and 9. Operations are now described for how base codes can become associated with final EPCs.

In principle, an item can be identified before it is grouped with the others. A challenge is that grouping makes it difficult to identify the item again. The challenge is harder if there are many items in the group, and the ones near the center are not visible by a line-of-sight operation. The challenge is even harder if the entire group is placed in an opaque container, in which none of the items are visible.

In embodiments of the invention, an additional data carrier is used for at least some of the items. An example is now described.

Figure 13:
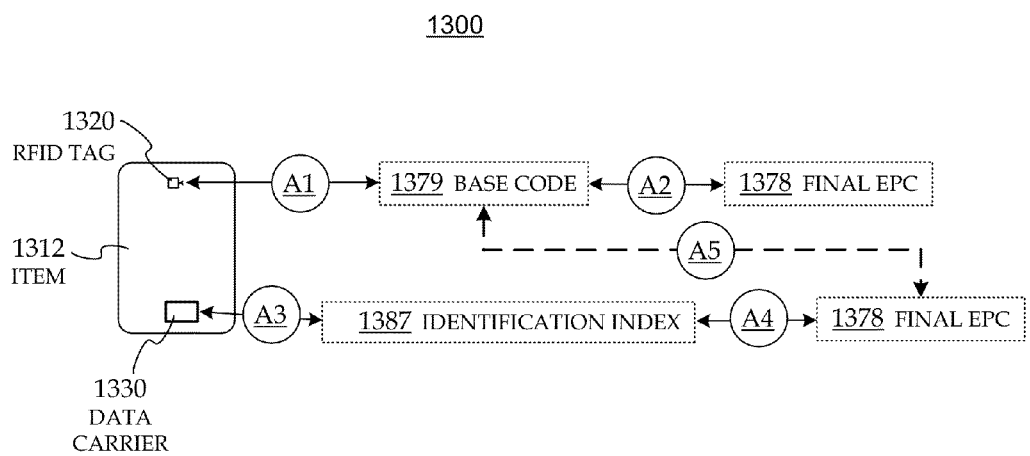
FIG. 13 is a diagram for showing associations of indicators for identifying an item in its group according to embodiments.

FIG. 13 is a diagram for showing relationships of physical items and indicators for identifying an item in its group. A sample item 1312 has an RFID tag 1320. A base code 1379 is stored in tag 1320 as is known by association A1. A final EPC 1378 becomes stored in tag 1320 as described above, via association A2 between final EPC 1378 and base code 1379.

Moreover, sample item 1312 has an additional data carrier 1330, which may be used for identifying item 1320 before it is grouped with the others. Data carrier 1330 may be implemented in any way known in the art for carrying a machine-readable identification index 1387, which is known according to association A3. As will be seen below, data carrier 1330 can be implemented in many different ways. Accordingly, from associations A3 and A1, first base code 1379 becomes associated with identification index 1387 with reference to item 1312.

In some embodiments, identification index 1387 is associated with intended final EPC 1378, according to association A4. Association A4, via associations A3 and A1, can establish association A5, which can be carried by database 828 of FIG. 8. In association A5, base code 1379 becomes associated with final EPC 1378 with reference to item 1312, by the knowledge of the other associations. Association A5 can therefore be used for the writing or encoding of final EPC 1378. Other arrangements of such associations are also possible.

Identification index 1387 can be associated with intended final EPC 1378 in any number of ways. For example, final EPC 1378 can be the same as identification index 1387. Or, final EPC 1378 can be looked up from identification index 1387. Alternately, final EPC 1378 can be derived from identification index 1387, and so on.

Figure 14:
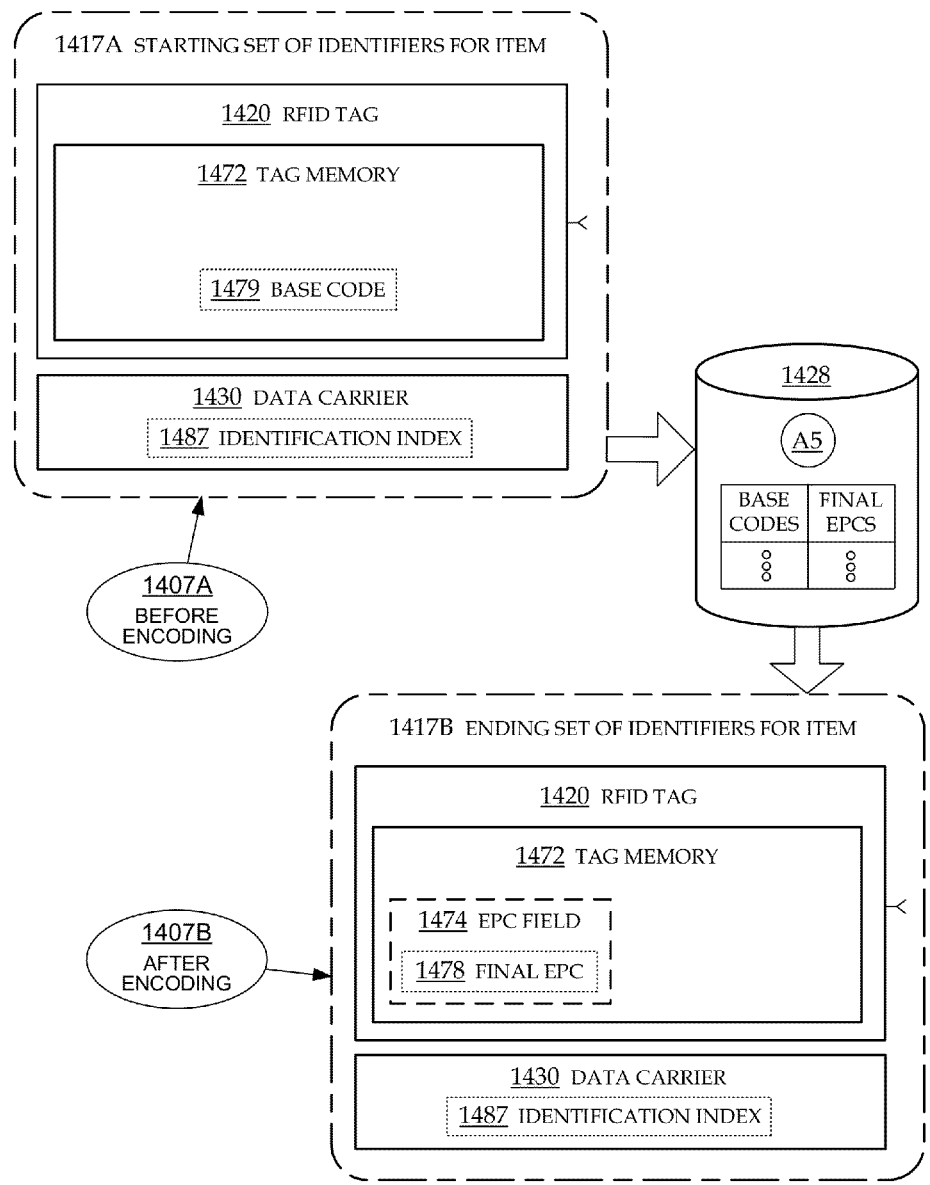
FIG. 14 is a diagram showing a data scheme for identifying items, and which further uses a data carrier and an identification index of FIG. 13, according to embodiments.

FIG. 14 is a diagram showing a data scheme for identifying items for the encoding, and which further uses a data carrier and an identification index of FIG. 13, according to embodiments. According to a comment 1407A, a starting set 1417A of identifiers is provided for the item before encoding. Set 1417A includes an RFID tag 1420, similar, for example, to tag 620, tag 120, tag 220, etc. Set 1417A also includes a data carrier 1430 that stores an additional identification index 1487.

RFID tag 1420 includes a memory 1472, into which a base code 1479 is stored. Base code 1479 can be stored in any field of memory 1472, as per the above.

According to a comment 1407B, an ending set 1417B of identifiers is provided for the same item, after encoding. Set 1417B includes RFID tag 1420, whose memory 1472 has an EPC field 1474 that contains final EPC 1478. Final EPC 1478 has been learned for the encoding from database 1428, which stores association A5 of FIG. 13. In ending set 1417B, data carrier 1430, and its stored identification index 1487 may be the same or different.

Figure 15:
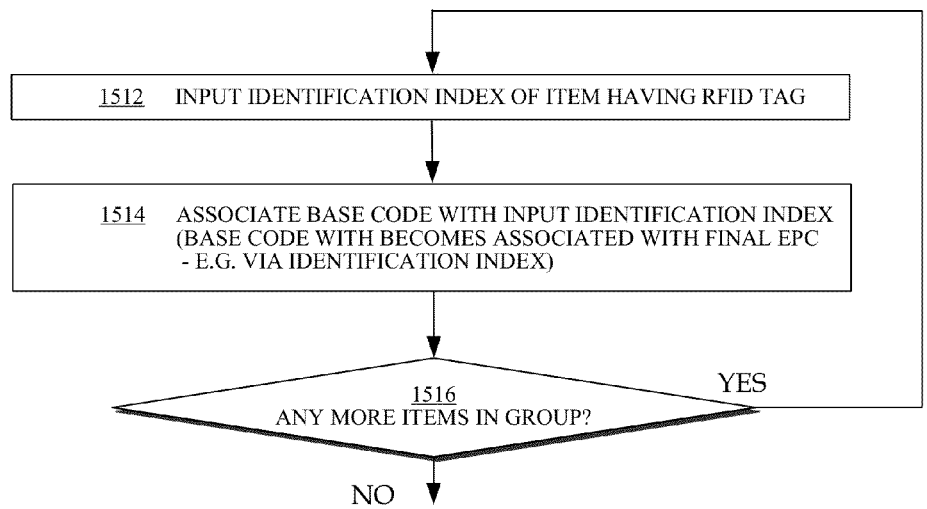
FIG. 15 is a flowchart showing embodiments for an operation of the method of FIG. 10, to further make use of the associations of FIG. 13.

FIG. 15 is flowchart 1510 illustrating methods according to other embodiments. The methods of flowchart 1510 can be for performing an operation 1010 of FIG. 13, in embodiments where the relationships of FIG. 13 are further used.

At operation 1512, an identification index is input for one of the tagged items. As will be described below, this can be performed in a number of ways, and at different times, also in view of the nature of the data carrier and the nature of the packaging system.

At next operation 1514, a base code becomes associated with the input identification index for that tag, as corresponding to that item, per associations A3 and A1 of FIG. 13. This can be performed in a number of ways. For example, the base code can become associated with the identification index by reading the base code from the tag, or by writing the base code to the tag, in conjunction with inputting the identification index of FIG. 1512.

A result of operation 1514 can be that the base code becomes associated with its corresponding first final EPC for the item per association A4. As such, the first final EPC is ready for the writing of operation 1050.

At next operation 1516, it is inquired whether there are more items in the group. Flowchart 1510 can be repeated for each of them.

As mentioned above, operation 1512 can be performed at different times, for example while the whole group of items has been received into the reading zone, or before. It can also be performed before the item becomes grouped with the others, concurrently, or after, and so on.

A number of embodiments are possible for the data carrier, and the identification index. In some embodiments, the data carrier is a second RFID tag of the first item, and the identification index can be stored in the second RFID tag. In operation 1512, the identification index can be input from a database. Plus, for operation 1514, the first base code can be associated with the identification index as above. In conjunction, the identification index can be input from the second RFID tag, or written to it.

In other embodiments, the data carrier stores the identification index in a manner that is visually readable by a line-of-sight reader. This can be implemented in any number of ways. Such ways include one-dimensional bar codes and two-dimensional bar codes, which are readable by the appropriate bar code scanner. Another such way includes a label that is readable by humans, and also by an Optical Character Recognition ("OCR") scanner. In operation 1512, the identification index can be input from a database. Plus, for operation 1514, the first base code can be associated with the identification index as above. In conjunction, the identification index can be read from the data carrier, or written to it. Alternately, the data carrier can then be attached to the item.

Figure 16:
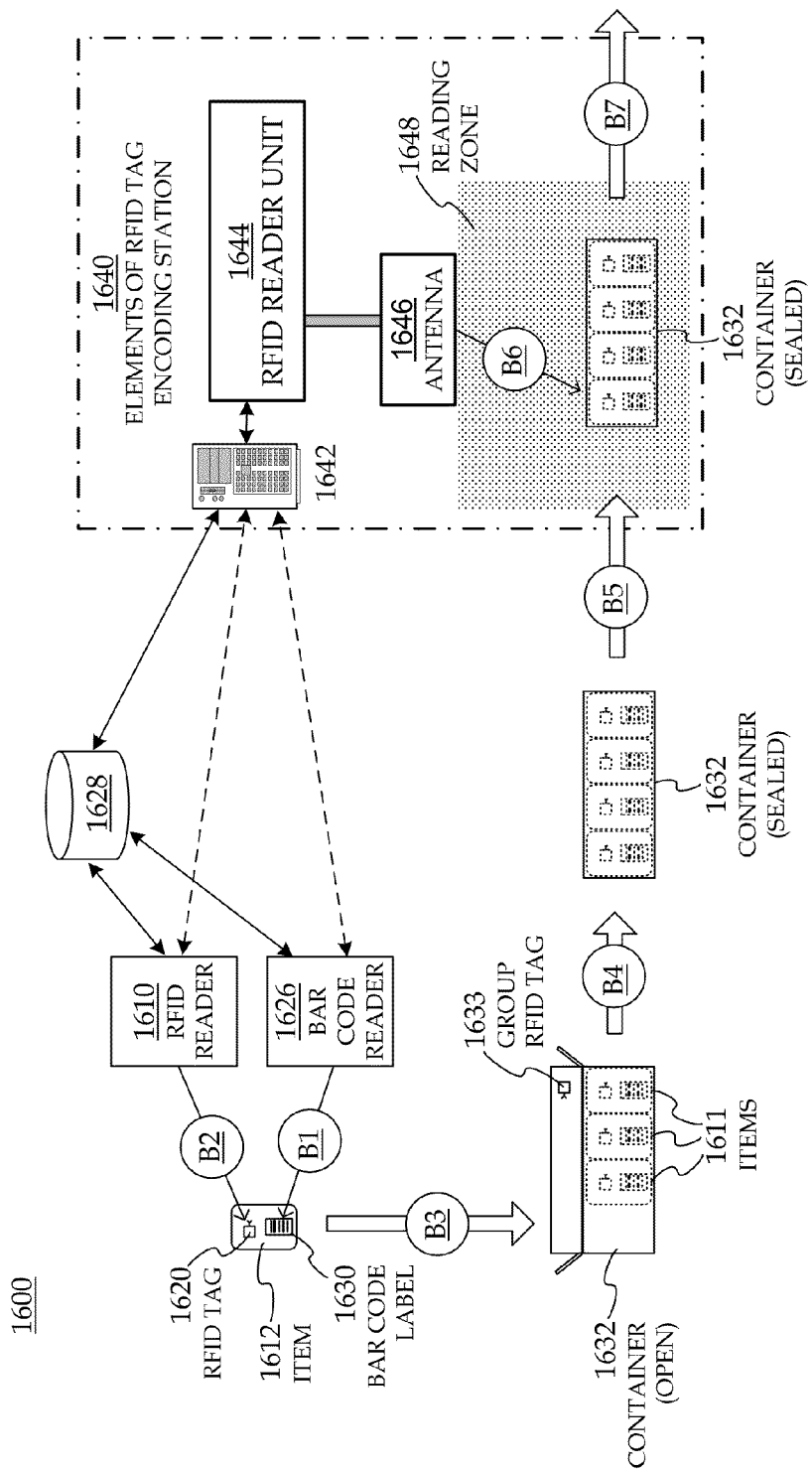
FIG. 16 is a diagram showing a first system and operations according to embodiments.

FIG. 16 is a diagram 1600 showing a system and operations according to embodiments. In its arrangement, diagram 1600 prioritizes spatial locations.

Diagram 1600 includes elements 1640 of an RFID tag encoding station, which are similar to those of FIG. 6. More particularly, elements 1640 include a computer 1642 like computer 642, a reader unit 1644 like unit 644, and an antenna 1646 like antenna 646, which defined a reading zone 1648 like reading zone 648. Associations that are looked up can be stored in a database 1628, or computer 1642 or reader unit 1644.

A bar code reader 1626 is coupled to database 1628, or computer 1642. A second RFID reader 1610 is also coupled to database 1628, or computer 1642. An item 1612 has attached on it an RFID tag 1620, and a bar code label 1630, which serves as data carrier 1330 in this example.

According to an operation B1, bar code reader 1626 reads a bar code from bar code label 1630. In addition, RFID reader 1610 reads a base code RFID tag 1620 according to operation B2. Operations B1 and B2 are coordinated, so as to associate with certainty the read bar code with the input base code. The associated numbers are input in database 1628, or computer 1642.

Further, according to an operation B3, item 1612 is placed in a container 1632 so as to form a group with other tagged items 1611. Container 1632 also includes a group RFID tag 1633.

According to a next operation B4, container 1632 is then sealed. According to a next operation B5, container 1632 is then delivered to reading zone 1648 by a delivery system (not shown). According to a next operation B6, a final EPC is encoded on RFID tag 1620, and preferably also on the tags of all items 1611. According to a next operation B7, container 1632 is then conveyed away from reading zone 1648.

Figure 17:
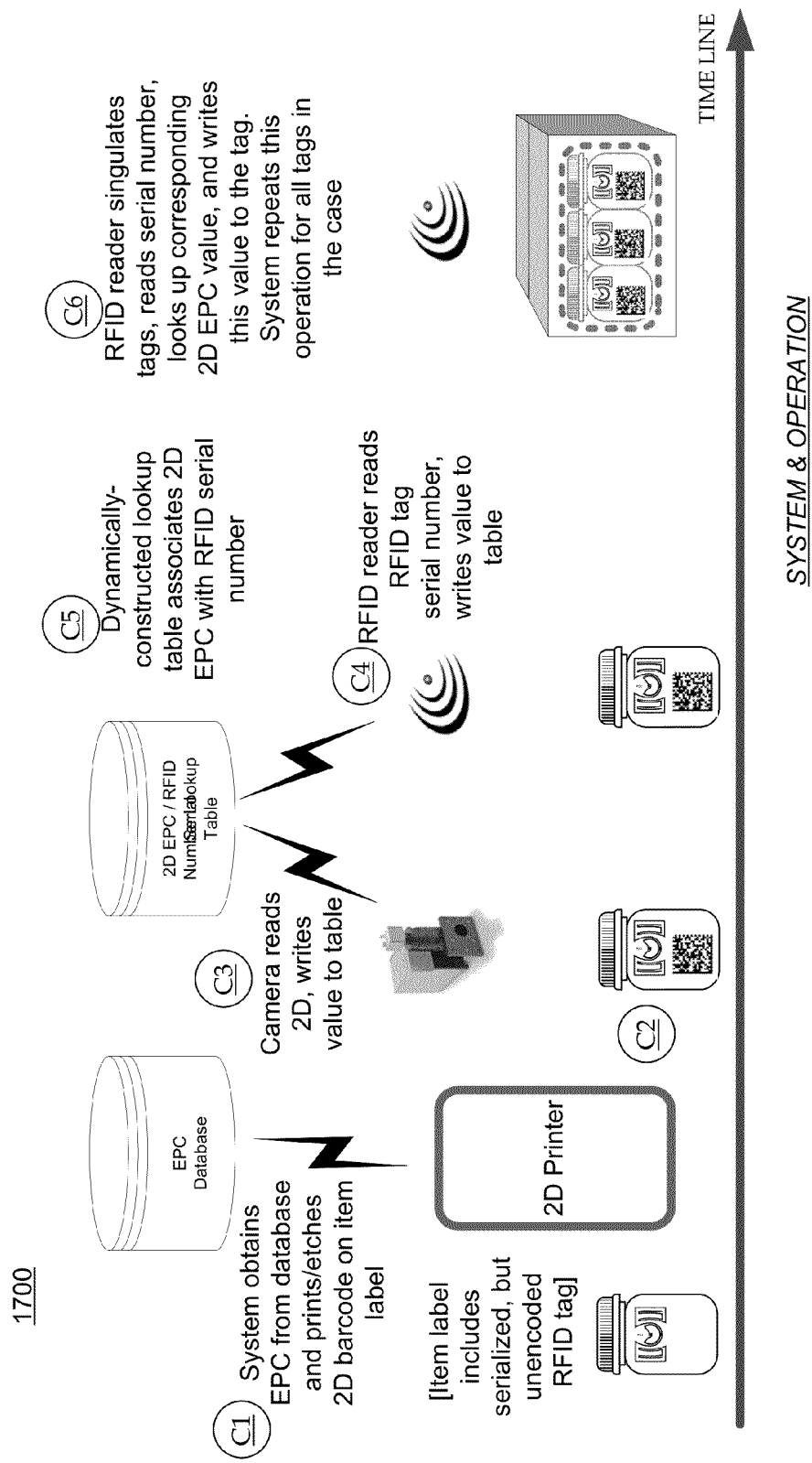
FIG. 17 is a diagram showing a second system and operations according to embodiments.

FIG. 17 is a diagram 1700 showing a system and operations according to embodiments. In its arrangement, diagram 1700 prioritizes a time line of execution. In diagram 1700, the items are pill bottles. In addition, the data carrier is a 2D bar code label, and the identification index is the final EPC itself. The base code can be the serialized TID or user memory.

The actions in operations C1 through C7 are spelled out. In operation C2, it is a printer that generates the 2D bar code label, which is then attached to the item. The remaining operations are as per the above.

The invention additionally includes programs, and methods of operation of the programs. A program is generally defined as a group of steps or operations leading to a desired result, due to the nature of the elements in the steps and their sequence. A program is usually advantageously implemented as a sequence of steps or operations for a processor, such as the structures described above.

Performing the steps, instructions, or operations of a program requires manipulation of physical quantities. Usually, though not necessarily, these quantities may be transferred, combined, compared, and otherwise manipulated or processed according to the steps or instructions, and they may also be stored in a computer-readable medium. These quantities include, for example, electrical, magnetic, and electromagnetic charges or particles, states of matter, and in the more general case can include the states of any physical devices or elements. It is convenient at times, principally for reasons of common usage, to refer to information represented by the states of these quantities as bits, data bits, samples, values, symbols, characters, terms, numbers, or the like. It should be borne in mind, however, that all of these and similar terms are associated with the appropriate physical quantities, and that these terms are merely convenient labels applied to these physical quantities, individually or in groups.

The invention furthermore includes storage media. Such media, individually or in combination with others, have stored thereon instructions of a program made according to the invention. A storage medium according to the invention is a computer-readable medium, such as a memory, and is read by a processor of the type mentioned above. If a memory, it can be implemented in a number of ways, such as Read Only Memory (ROM), Random Access Memory (RAM), etc., some of which are volatile and some non-volatile.

Even though it is said that the program may be stored in a computer-readable medium, it should be clear to a person skilled in the art that it need not be a single memory, or even a single machine. Various portions, modules or features of it may reside in separate memories, or even separate machines. The separate machines may be connected directly, or through a network such as a local access network (LAN) or a global network such as the Internet.

Often, for the sake of convenience only, it is desirable to implement and describe a program as software. The software can be unitary, or thought in terms of various interconnected distinct software modules.

This detailed description is presented largely in terms of flowcharts, algorithms, and symbolic representations of operations on data bits on and/or within at least one medium that allows computational operations, such as a computer with memory. Indeed, such descriptions and representations are the type of convenient labels used by those skilled in programming and/or the data-processing arts to effectively convey the substance of their work to others skilled in the art. A person skilled in the art of programming may use these descriptions to readily generate specific instructions for implementing a program according to the present invention.

Embodiments of an RFID reader system can be implemented as hardware, software, firmware, or any combination. It is advantageous to consider such a system as subdivided into components or modules. A person skilled in the art will recognize that some of these components or modules can be implemented as hardware, some as software, some as firmware, and some as a combination. An example of such a subdivision is now described.

An economy is achieved in the present document in that a single set of flowcharts is used to describe methods in and of themselves, along with operations of hardware and/or software and/or firmware. This is regardless of how each element is implemented.

Figure 18:
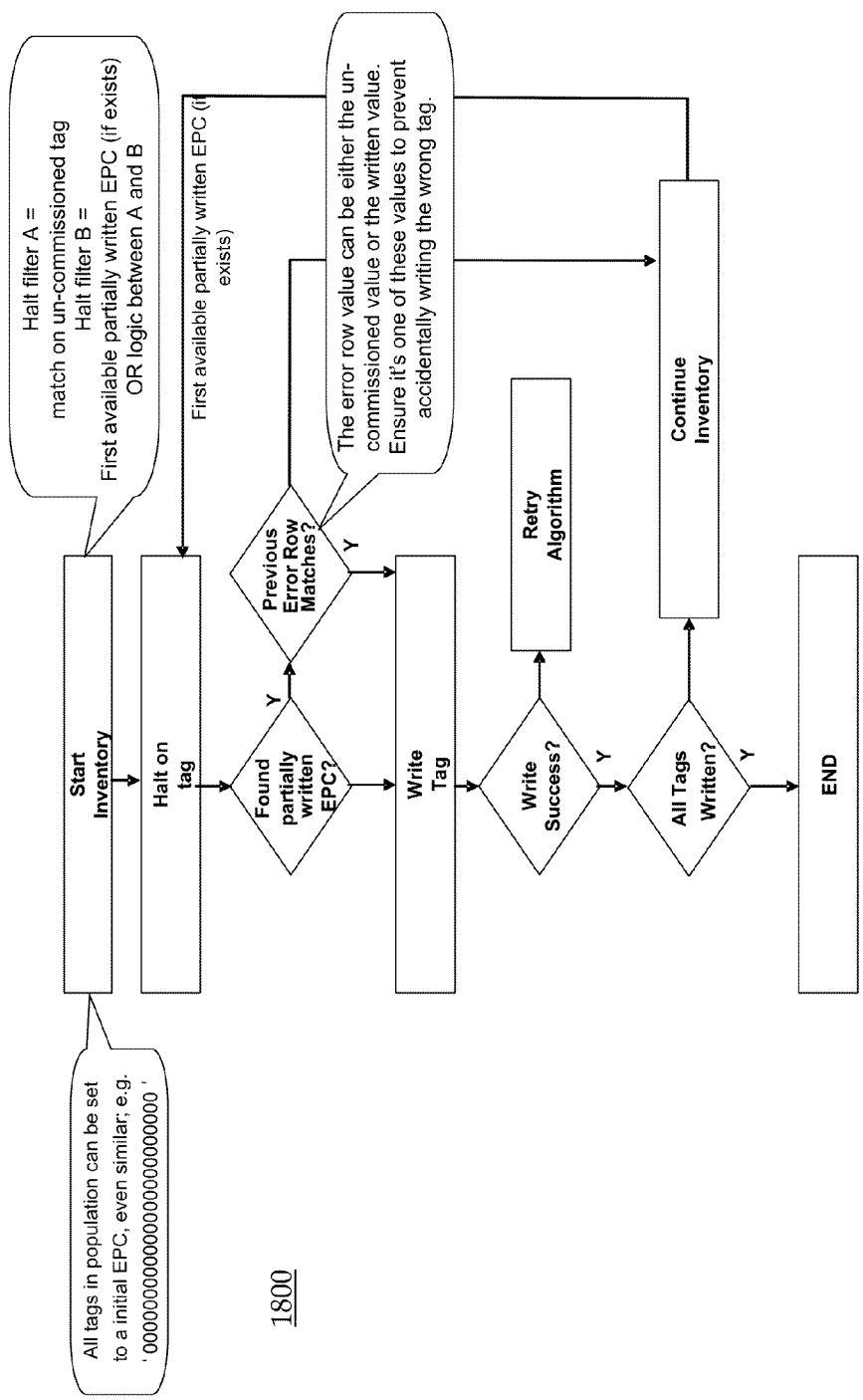
FIG. 18 is a flowchart illustrating methods of writing according to embodiments.

FIG. 18 is a flowchart 1800 illustrating methods of writing according to embodiments. Flowchart 1800 shows operations for implementing such steps, when an initial EPC is used. In this embodiment, when the group is received into the reading zone, all the tags already have the same initial EPC written in respective memories, which are also read along with the base codes. Accordingly, when additional ones of the remaining tags are then further singulated, as in operations 1070, 1030, a filter is used in the further singulation. This filter rejects more quickly a tag that has the first final EPC over one that has the initial EPC.

Figure 19:
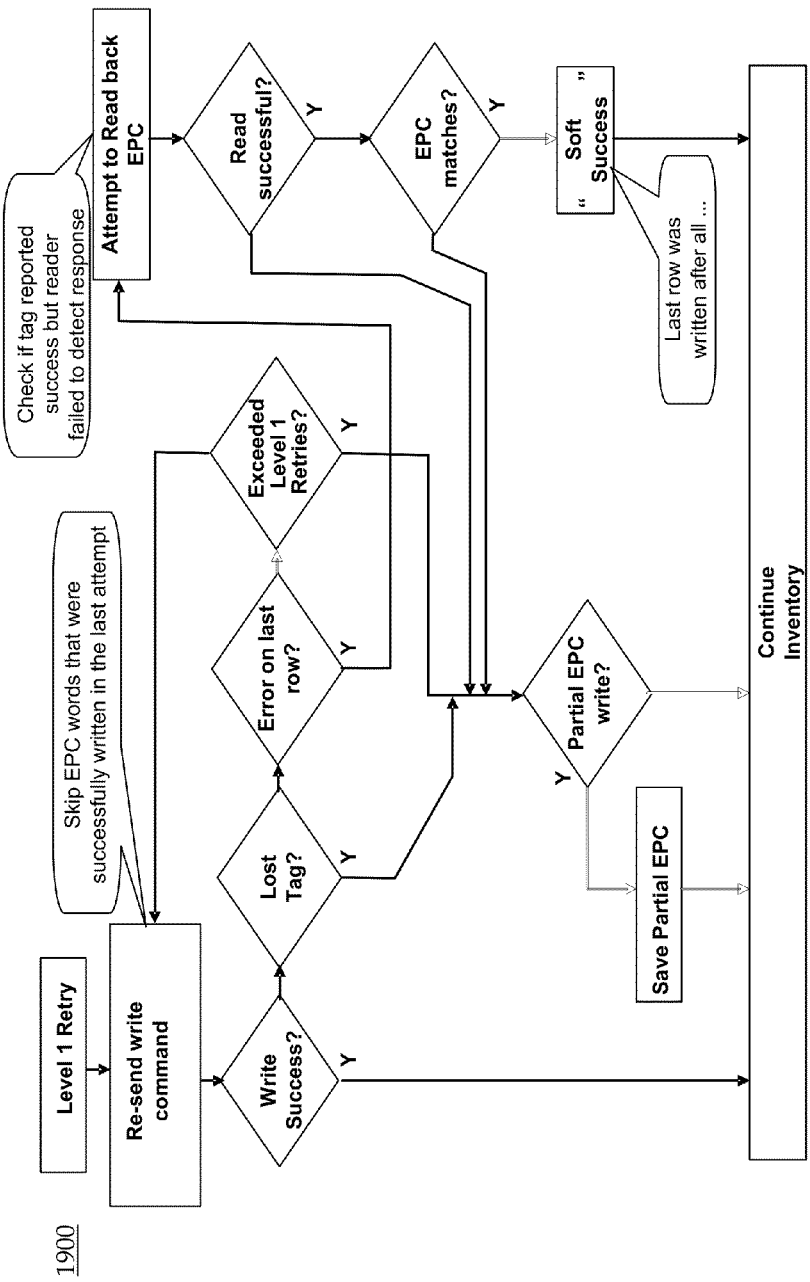
FIG. 19 is a flowchart illustrating methods of retrying to write according to embodiments.

FIG. 19 is a flowchart 1900 illustrating methods of retrying to write according to embodiments. Flowchart 1900 shows operations for implementing such steps. These can be for operation 1064, or 1084.

Numerous details have been set forth in this description, which is to be taken as a whole, to provide a more thorough understanding of the invention. In other instances, well-known features have not been described in detail, so as to not obscure unnecessarily the invention.

The invention includes combinations and subcombinations of the various elements, features, functions and/or properties disclosed herein. The following claims define certain combinations and subcombinations, which are regarded as novel and non-obvious. Additional claims for other combinations and subcombinations of features, functions, elements and/or properties may be presented in this or a related document.

The invention claimed is:

1. A method for an Radio Frequency Identification (RFID) reader for writing an Electronic Product Code (EPC) into an RFID tag, the method comprising:
singulating a first one of tags in a group,
determining that the first one of the tags is not encoded with a final EPC, reading a base code tag from the first one of the tag,
deriving the final EPC from the base code,
determining that the first one of the tags is encoded with an initial EPC and overwriting the initial EPC with the final EPC to a memory of the first one of the tags,
singulating successively each of the other tags in the group while the group of tags is in a reading zone, and
setting an error flag if a number of the singulated tags disagrees with a preset group number or if an error is detected.

2. The method of claim 1, wherein deriving the final EPC from the base code further comprises using a table in a database, the database residing in one of the RFID reader, a computer, and an enterprise database.

3. A Radio Frequency Identification (RFID) reader configured to write an Electronic Product Code (EPC) into an RFID tag, the reader comprising:
a reader memory for storing instructions; and
a processing block coupled to the reader memory and configured to:
singulate a first one of tags in a group,
determine that the first one of the tags is not encoded with a final EPC,
read a base code from the first one of the tags,
derive the final EPC from the base code,
determine that the first one of the tags is encoded with an initial EPC and overwrite the initial EPC with the final EPC to a memory of the first one of the tags,
singulate successively each of the other tags in the group while the group of tags is in a reading zone, and set an error flag if a number of the singulated tags disagrees with a preset group number or if an error is detected.

4. The reader of claim 3, wherein the processor is further configured to derive the final EPC from the base code using a table in a database, the database residing in one of the RFID reader, a computer, and an enterprise database.

5. A method for an Radio Frequency Identification (RFID) reader for writing an Electronic Product Code (EPC) into an RFID tag, the method comprising:
singulating a first one of the tags in a group moving in a container on a conveyor,
determining that the first one of the tags is not encoded with a final EPC,
reading a base code from the first one of the tags,
deriving the final EPC from the base code,
determining that the tag is encoded with an initial EPC and overwriting the initial EPC with the final EPC to a memory of the first one of the tags,
setting an error flag if an error is detected,
singulating successively each of the other tags in the group while the group of tags is in a reading zone,
setting an error flag if a number of the singulated tags disagrees with a preset group number or if an error is detected, and
if the error flag is set, diverting the container from a main path on the conveyor.

6. The method of claim 5, wherein deriving the final EPC from the base code comprises using a table in a database, the database residing in one of the RFID reader, a computer, and an enterprise database.

7. The method of claim 1, further comprising: diverting the group of tags if the error flag is set.

8. The reader of claim 1, wherein the processing block is further configured to: divert the group of tags if the error flag is set.

* * * * *

UNITED STATES PATENT AND TRADEMARK OFFICE
CERTIFICATE OF CORRECTION

PATENT NO.        : 8,810,376 B1
APPLICATION NO.   : 13/623011
DATED             : August 19, 2014
INVENTOR(S)       : Picasso et al.

Page 1 of 1

It is certified that error appears in the above-identified patent and that said Letters Patent is hereby corrected as shown below:

In the Claims

In Column 16, Line 11, In Claim 1, after "code" delete "tag".

In Column 16, Line 12, In Claim 1, delete "tag," and insert -- tags, --, therefor.

In Column 17, Line 7, In Claim 8, delete "1," and insert -- 3, --, therefor.

Signed and Sealed this
Twenty-eighth Day of April, 2015

Michelle K. Lee
*Director of the United States Patent and Trademark Office*